(12) United States Patent
Haimerl et al.

(10) Patent No.: US 8,973,984 B1
(45) Date of Patent: Mar. 10, 2015

(54) OPENABLE VEHICLE ROOF

(71) Applicant: Webasto-Edscha Cabrio GmbH, Stockdorf (DE)

(72) Inventors: Alexander Haimerl, Bogen (DE); Georg Kopp, Plattling (DE)

(73) Assignee: Webasto-Edscha Cabrio GmbH, Stockdorf (DE)

( * ) Notice: Subject to any disclaimer, the term of this patent is extended or adjusted under 35 U.S.C. 154(b) by 0 days.

(21) Appl. No.: 14/152,874

(22) Filed: Jan. 10, 2014

(51) Int. Cl.
  *B60J 7/185* (2006.01)
  *B60J 7/06* (2006.01)
  *B60J 7/12* (2006.01)

(52) U.S. Cl.
  CPC ........................................ *B60J 7/061* (2013.01)
  USPC .......................................... 296/224; 296/219

(58) Field of Classification Search
  CPC ................................ B60J 7/185; B60J 7/1851
  USPC .................................................. 296/219, 224
  See application file for complete search history.

(56) References Cited

U.S. PATENT DOCUMENTS

| | | | |
|---|---|---|---|
| 6,398,296 B1 * | 6/2002 | Mayer | 296/219 |
| 2004/0169394 A1 * | 9/2004 | Obendiek et al. | 296/121 |

FOREIGN PATENT DOCUMENTS

DE 10 2006 050 874 B4 11/2010

* cited by examiner

*Primary Examiner* — Dennis H Pedder
(74) *Attorney, Agent, or Firm* — Fitch, Even, Tabin & Flannery, LLP (57) ABSTRACT

An openable vehicle roof is proposed, comprising a roof element, which is slidable in the vehicle longitudinal direction and extends in the roof transverse direction, and which is adjacent to a stationary vehicle portion in its closed position, as well as one guide rail respectively on both sides relative to a vertical longitudinal center plane of the roof, an actuating device for the roof element being guided in said guide rail, by means of which actuating device the roof element can be moved in the roof longitudinal direction and which actuating device includes a driven locking hook, the pivoting of which causes a vertical offset of the roof element with respect to the stationary vehicle portion between the closed position and an open position and which is engaged with a locking element in the closed position, wherein the roof element is pivotably mounted at a main slider via two support links and the roof element is displaced between the closed position and the open position by means of a coupling link, which is articulated to the locking hook.

11 Claims, 7 Drawing Sheets

OPENABLE VEHICLE ROOF

TECHNICAL FIELD

The invention relates to an openable vehicle roof that comprises a roof element, which is movable in the vehicle longitudinal direction and extends in the roof transverse direction, and which is adjacent to a stationary vehicle portion in its closed position.

BACKGROUND

An openable vehicle roof that is displaceable between a closed position spanning a vehicle interior and a releasing position at least partially opening up the vehicle interior to the top, is known, for example, from the document DE 10 2006 050 874 A1. Said vehicle roof comprises a foldable roof skin, at the front edge of which relative to the forward direction of travel of the respective vehicle a front bow is arranged that forms a rigid roof element which extends in the roof transverse direction, and which is adjacent to a front apron of the vehicle in the closed position of the vehicle roof. Said vehicle roof comprises one guide rail respectively on both sides relative to a vertical longitudinal center plane of the roof, in which guide rail an actuating device for the front bow is guided. By means of the actuating device, the roof element can be moved in the roof longitudinal direction and, in the closed position of the roof by means of a locking hook, can additionally be secured at a corresponding locking bolt. Additionally, the front bow can be deployed to the top by means of the actuating device when the roof is opened. When the front bow is displaced into the closed position, high closing forces need to be procured.

SUMMARY

It is an object of the invention to create an openable vehicle roof that comprises a roof element, which extends in the vehicle transverse direction and is movable in the vehicle longitudinal direction, and which is displaceable by means of an actuating device that is guided in a guide rail, and which is designed in an optimized manner regarding the closing forces to be procured compared to known vehicle roofs of the aforementioned type.

In accordance with the invention, an openable vehicle roof is therefore proposed, comprising a roof element, which is moveable in the vehicle longitudinal direction and extends in the roof transverse direction, and which is adjacent to a stationary vehicle portion in its closed position, as well as one guide rail respectively on both sides relative to a vertical longitudinal center plant of the roof, an actuating device for the roof element being guided in said guide rail, by means of which actuating device the roof element can be moved in the roof longitudinal direction and which actuating device includes a driven locking hook, the pivoting of which causes a vertical offset of the roof element with respect to the stationary vehicle portion between the closed position and an open position and which is engaged with a locking element in the closed position, wherein the roof element is pivotably mounted at a main slider via two support links and the roof element is displaced between the closed position and the open position by means of a coupling link, which is articulated to the locking hook.

With the vehicle roof according to the invention, the displacement forces required for displacing the roof element are thus introduced into the roof element by means of the coupling link. The coupling link is articulated to the locking hook. Consequently, displacing the locking hook leads to a displacing or lifting movement of the roof element, which is effected via the coupling link. The movement track of the roof element, when it is displaced, is defined by the design of the support links which are pivotably mounted at the main slider. The main slider forms a basis for the four-arm hinge of the roof element which is defined by the two support links.

In a preferred embodiment of the vehicle roof according to the invention, the coupling link and the support links are articulated to a carrier of the roof element. Consequently, the displacement threes, which are applied onto the roof element due to the movement of the locking hook, directly enter the same. This enables keeping the required drive forces small. It is also possible, due to the coupling link, to select a large pivot angle of the locking hook, wherein a correspondingly large moving path of a carriage for driving the locking hook can then also be selected. Consequently, the required drive forces can in turn be kept small.

Preferably, the locking hook is pivotably mounted at the main slider, too. Due to the main slider forming a common basis for the support links and the locking hook, a stable mounting of the roof element in the guide rails can be achieved.

In order to secure the final positions of the roof elements, it is expedient if the coupling link, in the closed position and/or in the open position of the roof element, assumes a dead center position with its axis with respect to a connection line between a pivot axis of the locking hook and an articulation point of the coupling link at the locking hook. Due to the dead center position, it is possible to keep the expenditure of force small, which is required in particular when the roof element is displaced into its closed position or its open position, since a kinematic reduction exists. Additionally, the roof element is secured in the respective position.

In a preferred embodiment of the vehicle roof according to the invention, the locking hook, when being displaced between an engaged position and a releasing position, is guided in a guide link, which is designed at the respective guide rail. Consequently, the pivoting movement of the locking hook can be precisely defined when it is displaced between the releasing position and the locked position.

In order to prevent an undesired displacing of the locking hook and consequently of the roof element when the roof element is moved in the rear direction starting from the closed position, the locking hook is preferably guided in a guide track of the respective guide rail when the roof element is moved in the roof longitudinal direction.

In order to be able to position the actuating device for the roof element exactly with respect to the locking element, it is advantageous if the main slider includes a centering means for positioning with respect to the locking element. The centering means is, for example, a centering fork, which accommodates the locking element which is designed as a bolt in particular. Consequently, the main slider assumes a clearly defined position with respect to the locking element before the locking hook is pivoted out of its releasing position into its engaged position exactly in the vehicle longitudinal direction and the vehicle vertical direction. Such a centering can also improve the positional stability of the roof element with high driving speeds of the respective vehicle. In particular, it is consequently also possible to prevent, in an effective manner, that the roof element is lifted off or deployed in an undesired manner.

Furthermore, the locking hook can be prestressed in the direction of its releasing position by means of a spring. The spring, which is, in particular, a helical spring, which reaches around a pivot axis of the locking hook, consequently supports the pivoting of the locking hook out of the engaged position into the releasing position.

Further advantages and advantageous configurations of the subject-matter of the invention can be taken from the description, the drawing and the claims.

DETAILED DESCRIPTION

Figure 1:
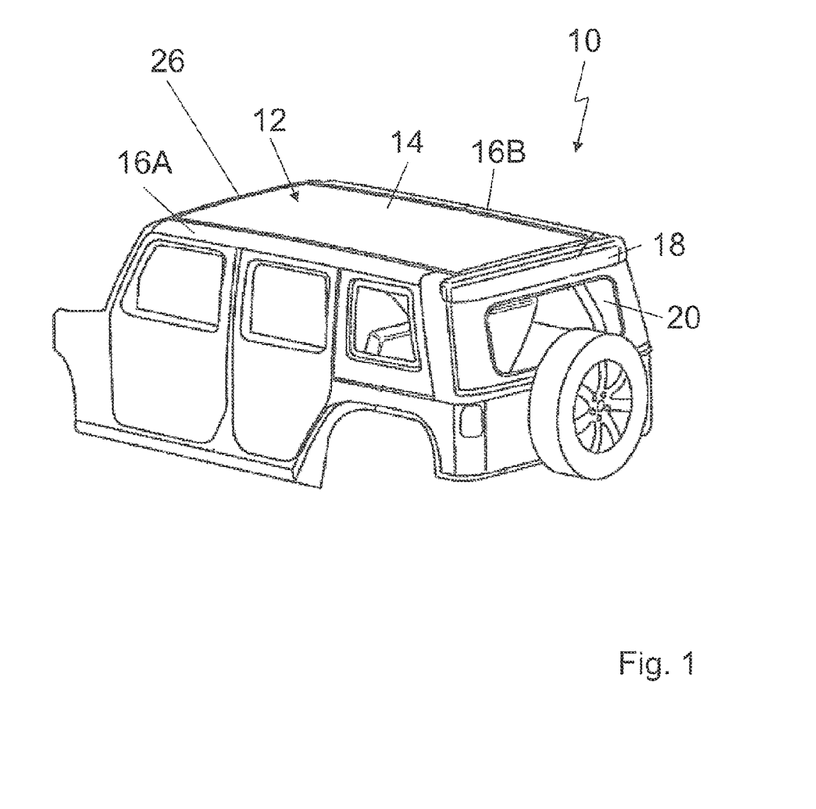
FIG. 1 shows a vehicle construction having an openable vehicle roof.

In FIG. 1, a motor vehicle 10 is illustrated which is designed as an all-terrain vehicle and includes a folding roof 12, by means of which a vehicle interior can optionally be closed or uncovered to the top. The folding roof 12 representing an openable vehicle roof comprises a folding roof portion 14, which is arranged between two lateral longitudinal roof beams, which form guide rails 16A and 16B for the folding roof portion 14. Furthermore, the folding roof 12 comprises a rear roof cassette 18, which forms a rear roof edge and which serves to accommodate the folding roof portion 14 in the open position thereof. Below the roof cassette 18, the motor vehicle 10 furthermore includes a rear window 20, which is designed so as to be pivotable, just like the roof cassette 18.

Figure 2:
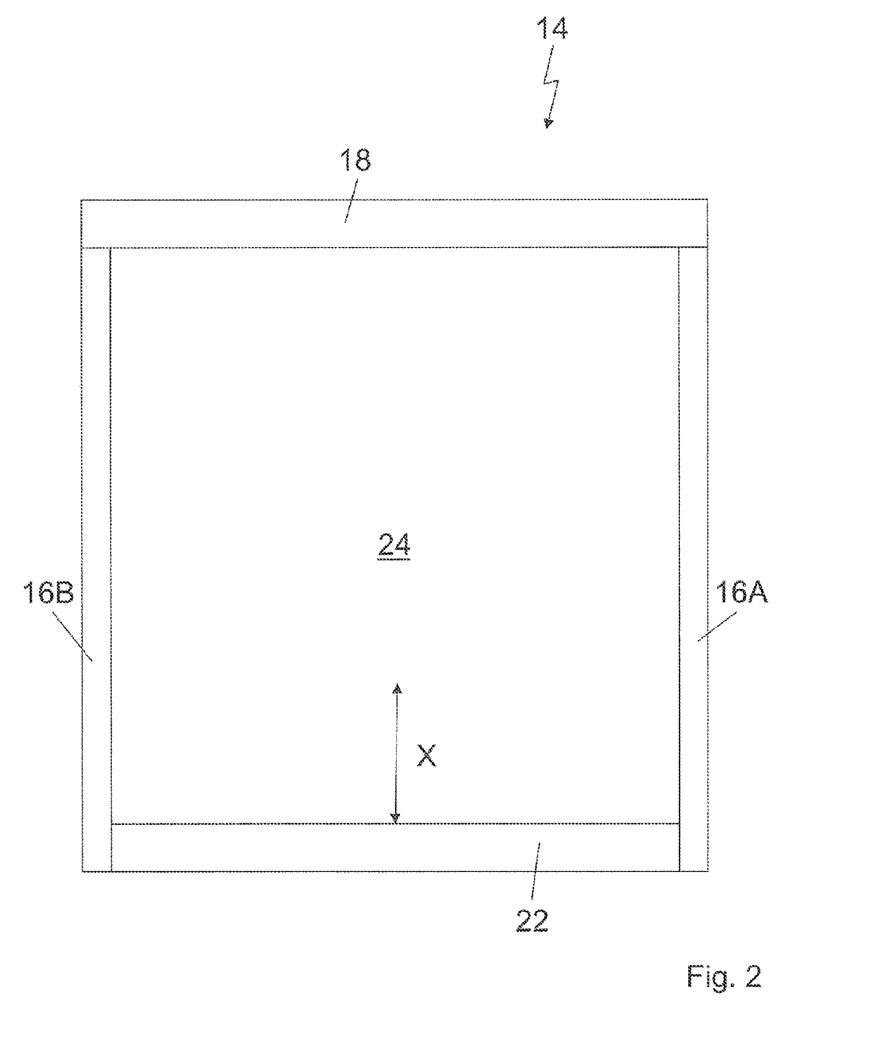
FIG. 2 shows a strongly schematized top view onto the vehicle roof

The folding roof portion and the folding roof 14, respectively, which is illustrated in a top view together with the guide rails 16A and 16B and the roof cassette 18 in FIG. 2, comprises a front bow 22, which forms a rigid roof element, which extends in the roof transverse direction and which limits a folding roof skin 24 in the front. In the closed position illustrated in FIG. 1, the front bow 22 is adjacent to a front apron 26 of the respective vehicle. The folding roof 14 comprises one actuating device 28 respectively on both sides for the front bow 22 relative to a vertical longitudinal center plane of the roof, such that said front bow is displaceable between a lowered closed position and a deployed open position, can be secured in the closed position and can be moved in the guide rails 16A and 16B along a double arrow X out of the closed position illustrated in FIG. 2 for uncovering or for spanning the vehicle interior.

The actuating devices 28, which are guided in the guide rails or longitudinal roof beams 16A and 16B, are designed mirror-symmetrically relating to the vertical longitudinal center plane of the roof. For reasons of clarity, only the actuating device which is arranged on the left in the forward direction of travel is described in the following. The actuating device which is arranged on the right in the forward direction of travel is designed correspondingly. Therefore, a detailed description thereof is omitted.

The actuating devices 28 comprise a main slider 30 respectively, which is slidably guided in the roof longitudinal direction in the respective guide rail 16B via a sliding element 32. The main slider 30 forms a basis of the actuating device 28. Via hinge points 34 and 36, two support links 38 and 40 are articulated to the main slider 30, said support links, via hinge points 42 and 44, being articulated to a carrier 46 for the front bow 22 with their ends facing away from the hinge points 34 and 36. The front bow 22 is fixed to fixing lugs 48 and 50 of the carrier 46. The carrier 46 can be formed integrally with the front bow 22 or as separate element to which the front bow is fixed.

A locking hook 54 is pivotably mounted at the main slider 30 at the front with respect to the support links 38 and 40 via a pivot axis 52, by means of which locking hook the front bow 22 can be secured at a locking bolt 56, which is rigidly connected to the guide rail 16B and is arranged in the front end portion thereof.

For driving the locking hook 54, the actuating device 28 includes a drive carriage 58, which is guided in the guide rail 16B so as to be movable via a sliding element 60 and which is connected to an incompressible drive cable 62, which can be actuated by means of a driving motor which is not illustrated in more detail. The drive carriage 58 can be moved relatively with respect to the main slider 30. Additionally, via a hinge 64, the drive carriage 58 is connected to a drive link 66, which is again articulated to the locking hook 54 via a hinge 68.

For displacing the front bow 22, a coupling link 72 is linked to the locking hook 54 via a hinge 70, which coupling link is articulated to the carrier 46 of the front bow 22 with its end facing away from the locking hook 54 via a hinge 74.

Figure 3:
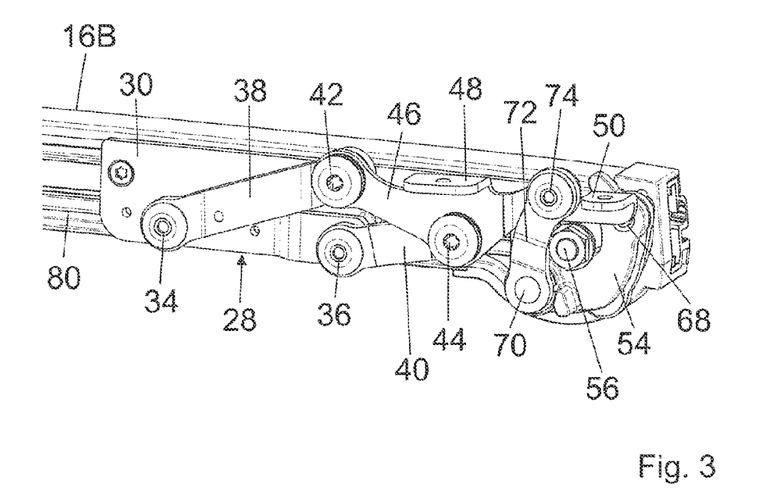
FIG. 3 shows a perspective side view of an actuating device for a front bow of is the vehicle roof in the closed position.
Figure 7:
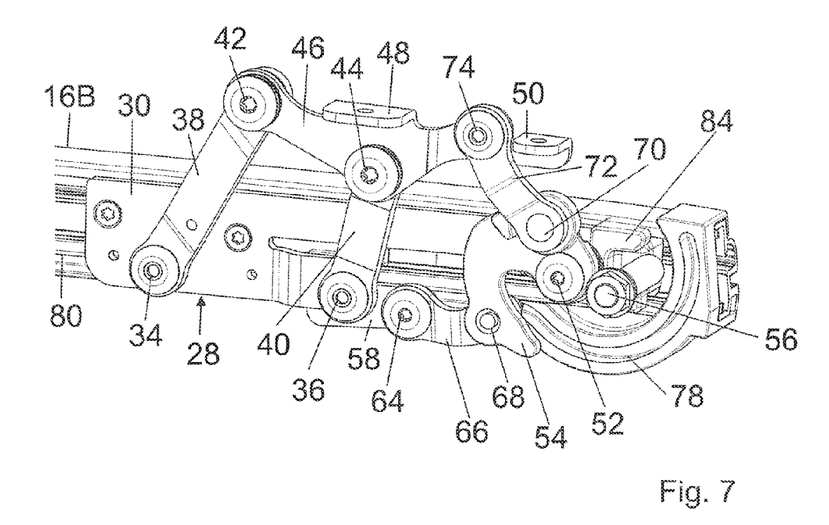
FIG. 7 shows the actuating device after a deployed open position of the front bow has been reached.
Figure 8:
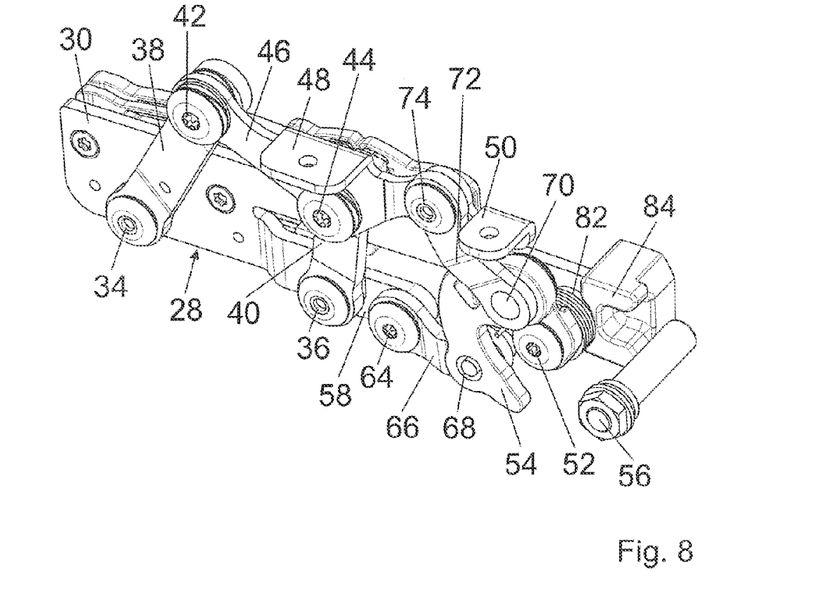
FIG. 8 shows a view of the actuating device corresponding to FIG. 7 to a large extent, but without a guide rail.
Figure 9:
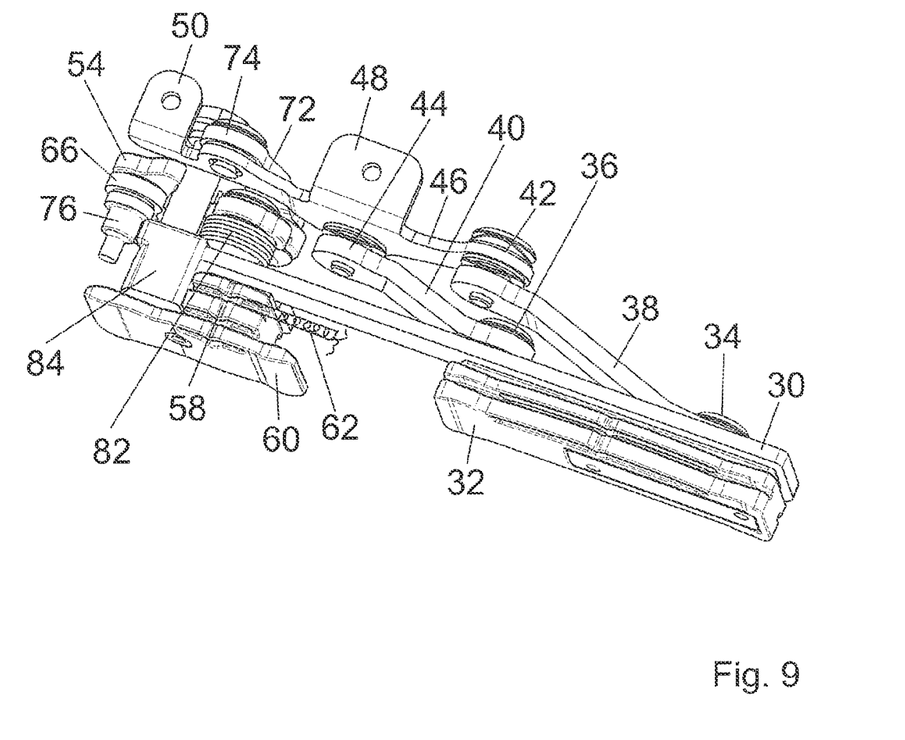
FIG. 9 shows a perspective top view of the actuating device without a guide rail.

The hinge 68, via which the drive link 66 is articulated to the locking hook 54, is formed by a pin 76, which is guided in a link track 78 when the locking hook 54 is displaced between an engaged position illustrated in FIG. 3, in which the locking hook 54 is engaged with the locking bolt 56, and the releasing position illustrated in FIG. 7, in which the locking hook 54 is detached from the locking bolt 56, said link track following a circular track, which reaches around the locking bolt 56. The link track 78 is designed in the front end portion of the guide rail 16A, in the rear direction ending in a guide track 80 of the guide rail 16B, which extends in the roof longitudinal direction and in a straight manner at least to a large extent, the pin 76 being guided in said guide track 80 when the main slider 30 is moved in the guide rail 16B.

In order to reduce the displacement forces when the actuating device is displaced out of the closed position into the open position illustrated in FIG. 7, the locking hook 54 is prestressed in the direction of the releasing position of a helical or leg spring 82 by means of the same, which reaches around the pivot axis 52 of the locking hook 54.

At its face side, the main slider 30 furthermore includes a centering fork 84, which, in the front end position of the main slider 30, is engaged with the locking bolt 56, which is designed at the guide rail 16B. Consequently, the main slider 30 is, in its front end position, precisely positioned in the roof longitudinal direction and the roof vertical direction with respect to the locking bolt 56. Further, the centering fork is supported by the guide rail 16B so that the main slider 30 can be supported in its front part.

Figure 10:
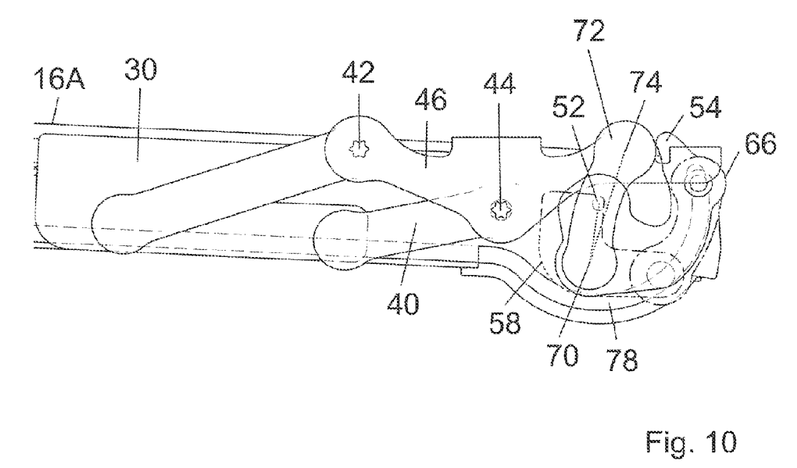
FIG. 10 shows a side view of the actuating device in the closed position of the front bow, wherein a over dead center position is illustrated.
Figure 11:
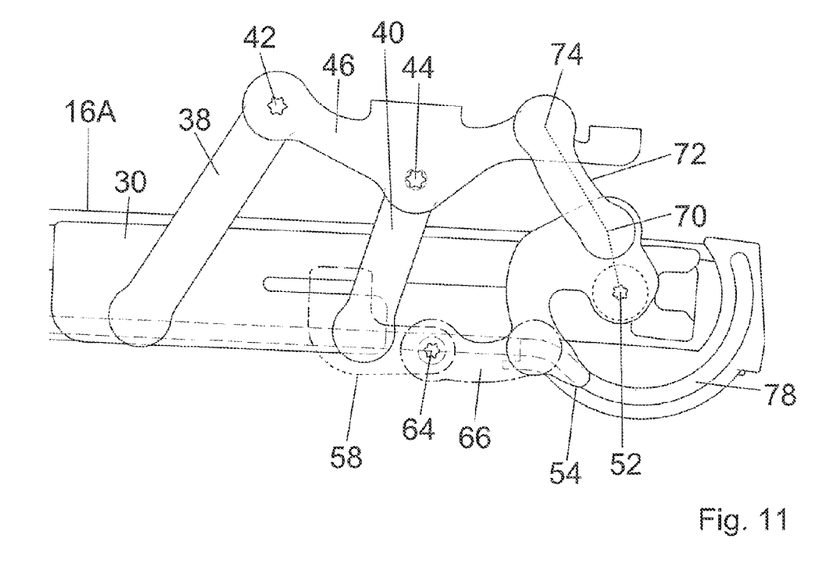
FIG. 11 shows the actuating device in the open position of the front bow, wherein a second over dead center position is illustrated.

As can in particular be taken from the FIGS. 10 and 11, the geometries of the locking hook 54 and of the coupling link 72 and the positions of the hinges 70 and 74 and of the pivot axis 52 of the locking hook 54 are selected, such that the coupling link 72, in the closed position of the front bow 22 (FIG. 10), assumes a over dead center position with its axis with respect to a connection line between the pivot axis 52 and the hinge 70. Consequently, tractive forces, which are applied onto the front bow 22, would lead to a moment on the locking hook 54, which acts in the blocked direction, that means, in FIG. 10, counterclockwise. Additionally, in the open position of the front bow 22 (FIG. 11), too, a corresponding over dead center position exists. In this case, a force that acts to the bottom can only introduce a moment onto the front bow 22 into the locking hook 54, which moment acts in the releasing direction, that means, in FIG. 11, clockwise.

The afore-described actuating device functions in the manner which is described in the following.

Figure 4:
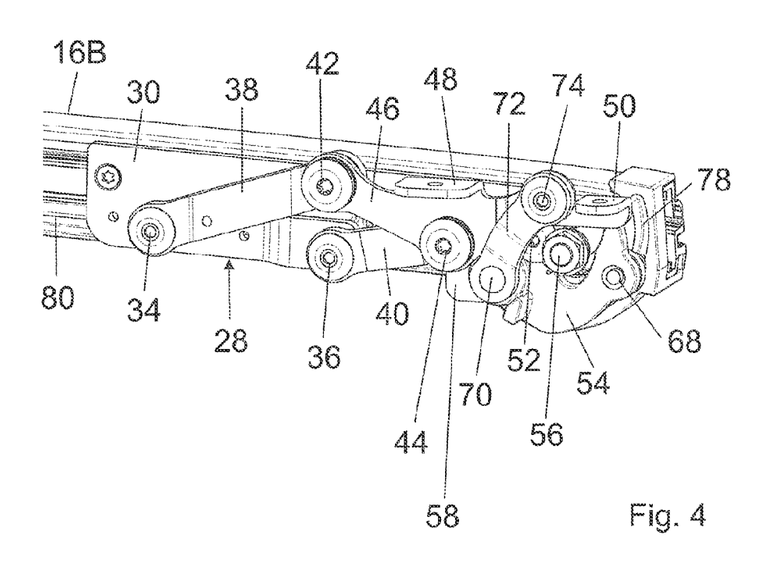
FIG. 4 shows the actuating device in a first displacement phase when a locking hook is released of a locking bolt.
Figure 5:
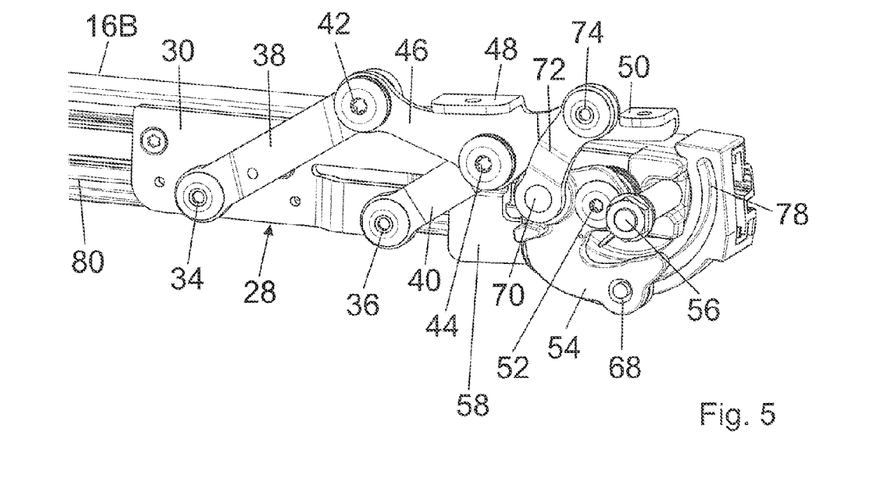
FIG. 5 shows the actuating device in a second displacement phase.
Figure 6:
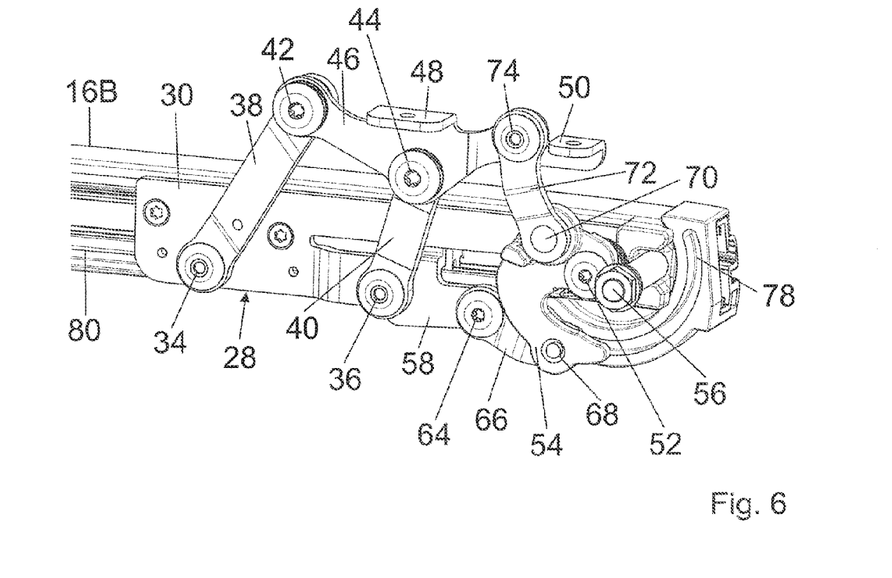
FIG. 6 shows the actuating device in a third displacement phase.

Starting from the closed position or engaged position of the locking hook 54 illustrated in FIG. 3, by means of the drive carriage 58, a displacement force is introduced into the locking hook 54 via the drive link 66. Said locking hook is consequently pivoted about the pivot axis 52 clockwise corresponding to FIGS. 4 to 6 in the orientation illustrated in the drawing and is guided in the link track 78 by means of the pin 76 here. Simultaneously, a lift force is introduced into the carrier 46 and, consequently, into the front bow 22, via the coupling link 72. The four-arm hinge, which is formed by the main slider 30, the support links 38 and 40 and the carrier 46, is thus actuated. Starting from the lifted position (FIG. 7), the actuating device 28, including the main slider 30 and the assembly elements articulated thereto, can then be moved in the guide rail 16B in the rear direction due to a drive force, which is further introduced into the drive carriage 58 in the link track 78. The front bow 22 is displaced into the closed position in the correspondingly reverse order.

LIST OF REFERENCE NUMERALS

10 Motor vehicle
12 Folding roof
14 Folding roof portion
16A, B Guide rail
18 Roof cassette
20 Rear window
22 Front bow
24 Roof skin
26 Front apron
28 Actuating device
30 Main slider
32 Sliding element
34 Hinge point
36 Hinge point
38 Support link
40 Support link
42 Hinge point
44 Hinge point
46 Carrier
48 Fixing lug
50 Fixing lug
52 Pivot axis
54 Locking hook
56 Locking bolt
58 Drive carriage
60 Sliding element
62 Drive cable
64 Hinge
66 Drive link.
68 Hinge
70 Hinge
72 Coupling link
74 Hinge
76 Pin
78 Link track
80 Guide track
82 Spring
84 Centering fork

The invention claimed is:

1. An openable vehicle roof, comprising a roof element, which is slidable in the vehicle longitudinal direction and extends in the roof transverse direction, and which is adjacent to a stationary vehicle portion in its closed position, as well as one guide rail respectively on both sides relative to a vertical longitudinal center plane of the roof, an actuating device for the roof element being guided in said guide rail, by means of which actuating device the roof element can be moved in the roof longitudinal direction and which actuating device includes a driven locking hook, the pivoting of which causes a vertical offset of the roof element with respect to the stationary vehicle portion between the closed position and an open position and which is engaged with a locking element in the closed position, wherein the roof element pivotably mounted at a main slider via two support links and the roof element is displaced between the closed position and the open position by means of a coupling link, which is articulated to the locking hook and to the roof element or roof element carrier.

2. The openable vehicle roof according to claim 1, wherein the locking hook, via a drive link, is connected to a carriage, which is guided in the respective guide rail.

3. The openable vehicle roof according to claim 2, wherein the carriage is connected to a drive means.

4. The openable vehicle roof according to one of the claims 1 to 3, wherein the coupling link, in the closed position and/or in the open position of the roof element, assumes a dead center position with its axis with respect to a connection line between a pivot axis of the locking hook and an articulation point of the coupling link at the locking hook.

5. The openable vehicle roof according to claim 1, wherein the locking hook, when being displaced between an engaged position and a releasing position, is guided in a guide link, which is designed at the guide rail.

6. The vehicle roof according to claim 1, wherein the locking hook is guided in a guide track of the respective guide rail when the roof element is moved in the roof longitudinal direction.

7. The openable vehicle roof according to claim 1, wherein the locking hook is pivotably mounted at the main slider.

8. The openable vehicle roof according to claim 1, wherein the main slider includes a centering means for positioning with respect to the locking element.

9. The openable vehicle roof according to claim 8, wherein the centering means is a centering fork, which accommodates the locking element.

10. The openable vehicle roof according to claim 1, wherein the locking hook is prestressed in the direction of its releasing position by means of a spring.

11. The openable vehicle roof according to claim 1, wherein the coupling link and the support links are articulated to the carrier of the roof element.

* * * * *